United States Patent
Vaccari et al.

(10) Patent No.: US 10,585,961 B2
(45) Date of Patent: *Mar. 10, 2020

(54) PATTERN LABELING

(71) Applicant: Facebook, Inc., Menlo Park, CA (US)

(72) Inventors: Andrea Vaccari, San Francisco, CA (US); Gabriel Grisè, San Francisco, CA (US); Mayank Lahiri, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,269

(22) Filed: Jul. 7, 2016

(65) Prior Publication Data

US 2016/0314133 A1  Oct. 27, 2016

Related U.S. Application Data

(63) Continuation of application No. 13/760,999, filed on Feb. 6, 2013, now Pat. No. 9,411,897.

(51) Int. Cl.
*G06F 17/30* (2006.01)
*G06F 16/9537* (2019.01)
(Continued)

(52) U.S. Cl.
CPC .......... *G06F 16/9537* (2019.01); *G06F 16/29* (2019.01); *G06F 16/9024* (2019.01); *G06Q 50/01* (2013.01)

(58) Field of Classification Search
CPC .......... G06F 17/3087; G06F 17/30241; G06F 17/30958; G06Q 50/01
(Continued)

(56) References Cited

U.S. PATENT DOCUMENTS

| 2006/0156209 A1 | 7/2006 | Matsuura |
| 2011/0022443 A1 | 1/2011 | Partridge |

(Continued)

FOREIGN PATENT DOCUMENTS

| CN | 102222002 A | 10/2011 |
| JP | 2012-42993 | 3/2012 |

(Continued)

OTHER PUBLICATIONS

Notification of Reasons for Rejection, Japan Patent Office, Patent Application No. 2015-557022 (with English Translation), dated Dec. 20, 2016.

(Continued)

*Primary Examiner* — Hicham Skhoun
(74) *Attorney, Agent, or Firm* — Baker Botts L.L.P.

(57) ABSTRACT

In one embodiment, a method includes accessing a log associated with a user. The log includes a number of entries that each indicate a geo-location of the user at a particular time of day of a particular day of a week. At least some of the data points being based on a geo-location determined and reported by a mobile computing device of the user without manual user input. The method also includes determining one or more geo-location centroids based on a distance between the respective geo-location centroid and each geo-location data point. Each geo-location centroid is representative of one or more of the geo-location data points obtained during the particular time of day of the particular day of a week.

20 Claims, 14 Drawing Sheets

(51) Int. Cl.
*G06F 16/29* (2019.01)
*G06F 16/901* (2019.01)
*G06Q 50/00* (2012.01)

(58) Field of Classification Search
USPC .......................................................... 707/736
See application file for complete search history.

(56) References Cited

U.S. PATENT DOCUMENTS

| | | | |
|---|---|---|---|
| 2011/0071881 A1 | 3/2011 | Zheng | |
| 2012/0040688 A1 | 2/2012 | Kobayashi | |
| 2012/0108259 A1* | 5/2012 | Weiss | G06Q 30/0261 455/456.1 |
| 2012/0324027 A1* | 12/2012 | Vaynblat | G06Q 50/01 709/206 |
| 2013/0273937 A1 | 10/2013 | Nakahara | |

FOREIGN PATENT DOCUMENTS

| | | |
|---|---|---|
| WO | WO 2004/077291 A1 | 9/2004 |
| WO | WO 2011/043429 A1 | 4/2011 |
| WO | WO 2012/096175 A1 | 7/2012 |

OTHER PUBLICATIONS

Supplementary European Search Report and Annex to the European Search Report for European Patent Application No. EP14749304, dated Jun. 9, 2016.
Decision of Rejection, Japan Patent Office, Patent Application No. 2015-557022 (with English translation), dated Apr. 25, 2017.
Notification of the First Office Action, The State Intellectual Property Office of the People's Republic of China, Application No. 2014800202849 (with English translation), dated Mar. 28, 2018.
Communication Pursuant to Article 94(3) for EP Application No. 14 749 304.3-1222, dated Mar. 4, 2019.

* cited by examiner

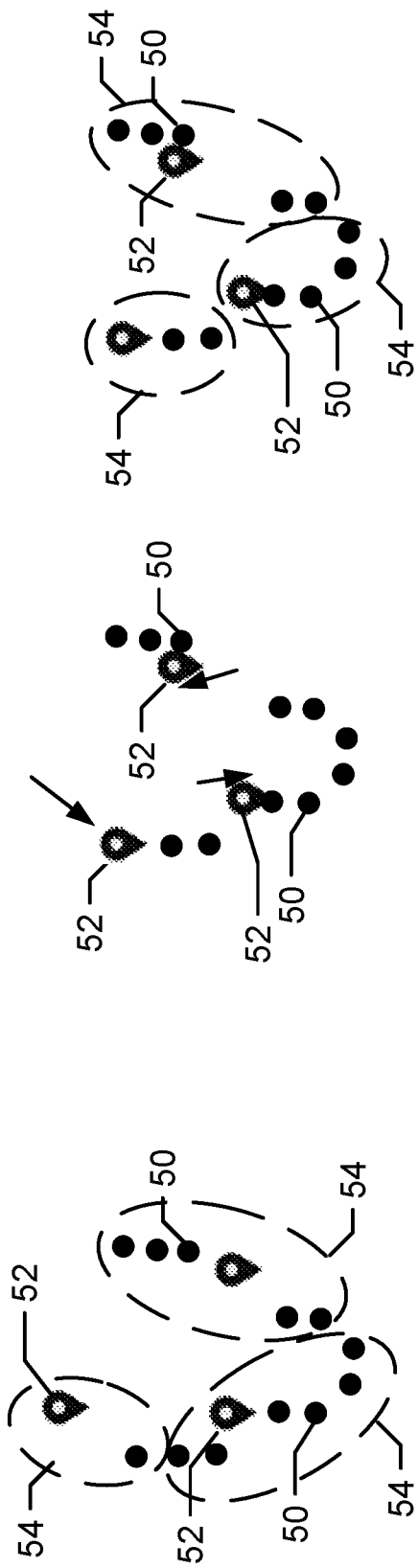

PATTERN LABELING

PRIORITY

This application is a continuation under 35 U.S.C. § 120 of U.S. patent application Ser. No. 13/760,999, filed 6 Feb. 2013.

TECHNICAL FIELD

This disclosure generally relates to location tracking.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, information of the user is inferred from the calculated routine. For example, the home location of the user may be inferred from location of the user between 2-5:00 AM every morning. In particular embodiments, the social-networking system may determine the locations frequented by the user based on the database of businesses and physical locations in conjunction with the routine of the user. For example, the social-networking system may infer the user is getting coffee at a particular Starbucks based on the routine of the user indicates the user is frequently at a particular location at a time prior to arriving at the work place. As another example, the social-networking system may infer the user is on vacation when the user is away from the inferred work location for an extended period of time or at a location that is a significant distance from the inferred work location.

BRIEF DESCRIPTION OF THE DRAWINGS

FIGS. 2A-C illustrate example grouping of ambient-location readings.

DESCRIPTION OF EXAMPLE EMBODIMENTS

Figure 1:
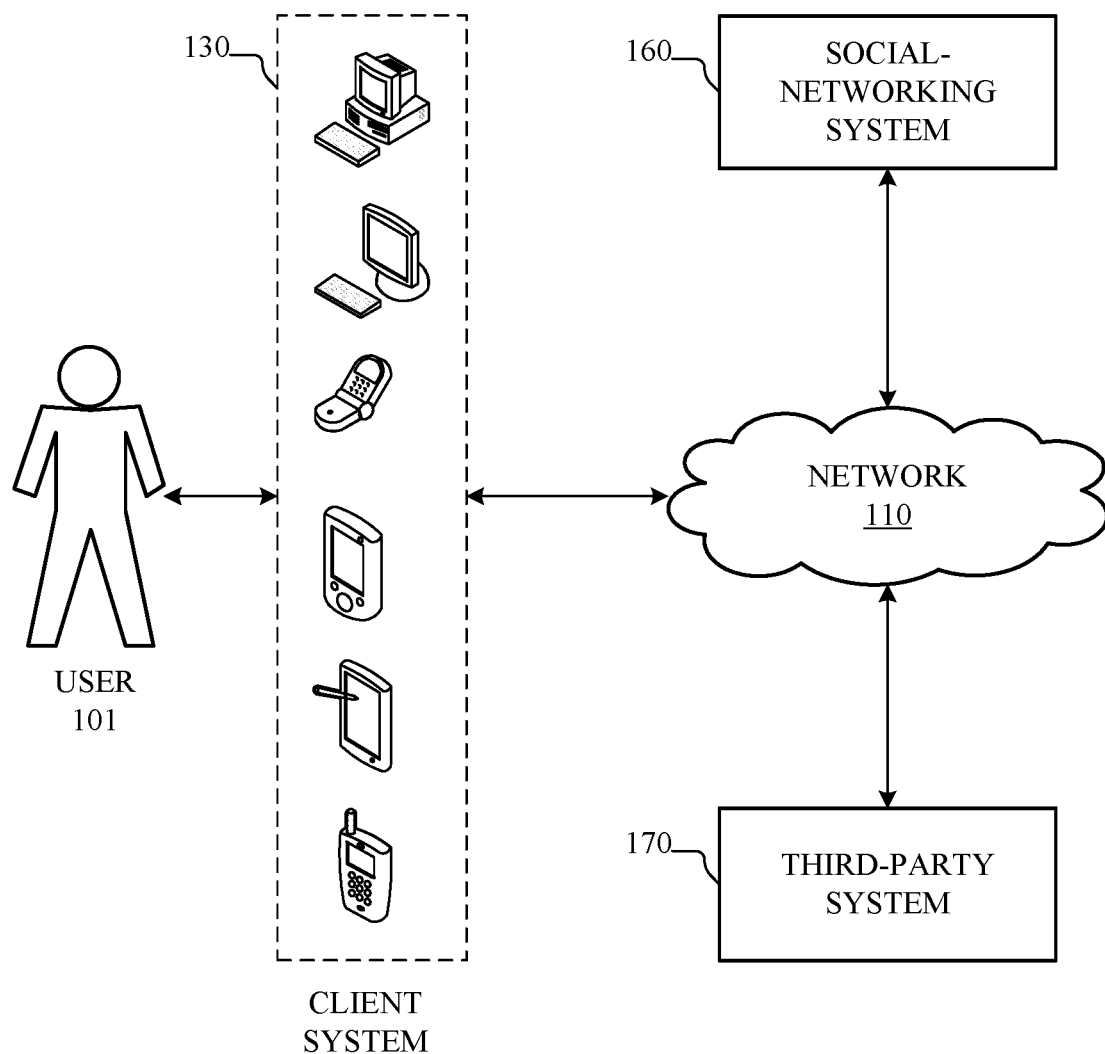
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users to opt in to or opt out of having their actions logged by social-networking system 160 or shared with other systems (e.g. third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 160 through blocking, data hashing, anonymization, or other suitable techniques as appropriate.

Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. In particular embodiments, user 101 may be authenticated based at least in part on social-graph information, described below, stored on social-networking system 160. As an example and not by way of limitation, social-networking system 160 may prevent unauthorized usage of social-networking system 160 or third-party system 170 by authenticating user 101 based at least in part on content objects associated with user 101. In particular embodiments, social-networking system 160 receives data from client system 130 corresponding to a selection of content objects and determines whether the selection corresponds to the content objects associated with user 101. Social-networking system 160 may send data to client system 130 authenticating user 101 based at least in part on whether the selection corresponds to the content objects associated with user 101. Client system 130 may be any suitable computing device, such as, for example, a personal computer, a laptop computer, a cellular telephone, a smartphone, or a tablet computer.

Social-networking system 160 or third-party system 170 may automatically and without any manual input from user 101, determine the current location of client system 130. In particular embodiments, social-networking system 160 or third-party system 170 may poll or "ping" an application executed on client system 130 for location data by transmitting an activation signal through network 110 using a wireless communication protocol such as for example, WI-FI or third-generation mobile telecommunications (3G). As an example and not by way of limitation, social-networking system 160 may periodically poll an application of client system 130 running in a background or "sleep" mode. In particular embodiments, the application may be an event-driven application that responds to the activation signal from social-networking system 160. Social-networking system 160 or third-party system 170 may adaptively adjust a pre-determined sampling duration and polling frequency of the location determination performed by the application executed on client system 130 based at least in part on the travel distance of client system 130. As an example and not by way of limitation, the pre-determined sampling duration and polling frequency may be adaptively adjusted based at least in part on whether client system 130 is moving or stationary. When client system 130 is moving and the travel distance is relatively large, social-networking system 160 may request location data from the application more frequently, but with lower accuracy. As another example, when client system 130 is substantially stationary and the travel distance is relatively small, the social-networking system 160 may request location data from client system 130 less frequently but with higher accuracy.

The accuracy of the location data measured by the application may be determined at least in part by the pre-determined sampling duration the location service of client system 130 is activated by social-networking system 160 or third-party system 170. Social-networking system 160 or third-party system may calculate the travel distance of client system 130 based at least in part on comparing the current location of client system 130 with the location from the previous reading. The travel distance of client system 130 may be approximated by the following equation:

$$\text{distance}_{travel} = (\text{position}_t - \text{position}_{t-1}) \quad (1)$$

Position$_t$ is the position of client system 130 at the most recent location reading and position$_{t-1}$ is the position of client system 130 at the second-most-recent location reading. As an example and not by way of limitation, when the travel distance of client system 130 is substantially equal or less than a pre-determined threshold distance, social-networking system 160 or third-party system 170 may determine client system 130 is stationary. In particular embodiments, the pre-determined distance may be the measurement accuracy of the global positioning system (GPS) function of client system 130. Although this disclosure describes adjusting the polling frequency and sampling duration to a particular number of discrete settings based on the travel distance, this disclosure contemplates adjusting the polling frequency and sampling duration to any suitable number of discrete settings or a continuum of settings based on the travel distance.

In particular embodiments, filtering of the location readings may suppress an amount of noise or uncertainty present in individual determinations of the location of client system 130 and reduce the amount of location data associated with client system 130 that is stored on social-networking system 160. In particular embodiments, the location data received by social-networking 160 or third-party system 170 may include information associated with the geographic coordinates and time the location data was measured. As described above, the received geographic coordinates may have an amount of imprecision, even when client system 130 is stationary. In particular embodiments, filtering the location readings may reduce the location readings to a representative geo-location data point that may be stored on social-networking system 160 or third-party system 170. In particular embodiments, a distance between the current location reading, such as for example postition$_t$, and the initial geo-location data point, such as for example at position$_{t-1}$, may calculated and the calculated distance is compared to a pre-determined threshold distance. As described above, the pre-determined threshold distance may be the measurement accuracy of the global positioning system (GPS) function of client system 130. In particular embodiments, the geographic coordinates of the initial geo-location data point may be recalculated and updated based at least in part on the initial geographic coordinates and the current location reading in response to the calculated distance being less than the pre-determined threshold distance. In particular embodiments, a time duration associated with the initial geographic coordinates may be updated with the time associated with the current location reading. In particular embodiments, a new geo-location data point may be created in response to the calculated distance being more than the pre-determined threshold distance. Subsequent location readings may be used to update the geographic coordinates associated with the new geo-location data point. In particular embodiments, the heading or speed of movement of client system 130 may be determined based at least in part on the location readings with a zero time duration. As an example and not by way of limitation, the time duration associated with client system 130 being in motion may be zero. In particular embodiments, social-networking system 160 or third-party system 170 may use filtering to classify multiple geo-location data points. As an example, social-networking system 160 may determine client system 130 has been stationary for a period of time or is moving in a particular heading and speed.

In particular embodiments, social-networking system 160 or third-party system 170 may group multiple location readings from client system 130 to determine a geographic cluster that is representative of the multiple geo-location data points. As an example and not by way of limitation, the multiple geo-location data points may grouped using a spatial-clustering algorithm, as described below. In particular embodiments, the spatial-clustering algorithm may represent multiple geo-location data points as one or more geographic clusters. In particular embodiments, social-networking system 160 or third-party system 170 may infer a time-based routine of user 101 based at least in part on the geographic centers determined using the spatial-clustering algorithm, described below. As described below, social-networking system 160 or third-party system 170 may group the geo-location clusters into one or more routine clusters. As described below, social-networking 160 or third-party 170 system may determine a pattern of user 101 based on the routine centers of the routine clusters. In particular embodiments, social-networking 160 or third-party 170 system may determine a place that corresponds to one or more of the routine centers. As an example and not by way of limitation, social-networking 160 or third-party 170 system may access a database of directory information and associate one or more of the routine centers to a particular residence.

As described above, social-networking system 160 or third-party system 170 may adaptively adjust the polling frequency of the location determination performed by the application executed on client system 130. In particular embodiments, social-networking 160 or third-party 170 system may adjust the polling frequency of the location readings based at least in part on a place that corresponds to one or more of the routine centers and the time of day associated with the routine centers. As an example and not by way of limitation, the polling frequency may be decreased when the current geo-location of user 101 is a home location and during the time it is inferred user 101 normally stays at the home location. As another example, the polling frequency may be decreased when the current geo-location of user 101 is a work place and during the time it is inferred user 101 normally is working at the work place. As described above, decreasing the polling frequency reduces the number of activation signals sent by social-networking 160 or third-party 170 system, thereby reducing the number of location readings.

In particular embodiments, social-networking system 160 may detect when user 101 deviates from the time-based routine inferred from multiple location readings of client system 130. In particular embodiments, social-networking system 160 or third-party system 170 may determine a deviation from the time-based routine based at least in part on calculating a distance between a current location reading of client system 130 and routine centers of user 101. As an example and not way of limitation, social-networking 160 or third-party system 170 may determine a particular routine center from the pattern of geo-locations with a minimum distance to the current location of client system 130. In particular embodiments, the particular routine center corresponds to the day of the week and time of day of the time information of the location data of client system 130. As described above, social-networking 160 or third-party 170 system may adjust the polling frequency of the location readings based at least in part on a place that corresponds to one or more of the routine centers and the time of day associated with the routine centers. In particular embodiments, social-networking 160 or third-party 170 system may increase the polling frequency in response to detect deviation from a inferred routine of the user 101. As an example and not by way of limitation, social-networking 160 or third-party 170 system may increase the polling frequency in response to detecting the current geo-location of user 101 deviates from the inferred work location of user 101 during the inferred work hours of user 101. In particular embodiments, social-networking 160 or third-party 170 system may determine an exigent situation is occurring based at least in part on the inferred place that corresponds to one or more of the routine centers and the time of day associated with the routine centers. As an example and not by way of limitation, social-networking 160 or third-party 170 system may infer an exigent situation is occurring in response to determining user 101 or other users are substantially simultaneously deviating from their inferred time-based routine. For example, social-networking 160 or third-party 170 system may determine an exigent situation is occurring in response to determining the current geo-location of user 101 and other users are deviating from a work place at substantially the same time. As another example, social-networking 160 or third-party 170 system may determine an exigent circumstance is occurring in response to determining the current geo-location of the user deviates from a routine center to an unusual geo-location that does not correspond to a place, e.g. an isolated location, for a prolonged period of time.

The social-networking 160 or third-party system 170 may access the time-based routine of user 101, described above, and determine a routine center of user 101 with the minimum distance from the current location of client system 130. In particular embodiments, a measure of deviation of user 101 from the time-based routine may be determined based at least in part on a distance between the current location of client system 130 and the closest routine center of user 101. As an example and not by way of limitation, social-networking system 160 may determine the distance between the current location of client system 130 and the closest routine center is more a pre-determined distance during work hours and infer user 101 is on vacation.

In particular embodiments, social-networking system 160 or third-party system 170 may send a notification to another user having a relationship with user 101 based at least in part on social-graph information and detection of deviation of the time-based routine by user 101. As example and not by way of limitation, social-networking system 160 may determine user 101 with a most probable location during work hours in Menlo Park is deviating from the time-based routine when user 101 is in San Francisco during work hours. Moreover, social-networking system 160 may determine the current location of other users with a relationship with user 101 based at least in part on social-graph information associated with user 101. In particular embodiments, other users with a relationship to user 101 who are currently located within a pre-determined distance from the current location of user 101 may receive a notification of the current location of user 101. As an example and not by way of limitation, another user currently in San Francisco may receive a notification that user 101 is in San Francisco in response to the time-based routine indicating user 101 is normally in Menlo Park.

In particular embodiments, information of user 101 may be inferred based at least in part on the time-based routine of user 101. In particular embodiments, social-networking system may correlate information stored in one or more databases with the time-based routine associated with user 101 to infer information of user 101. Information stored in the databases may include social-graph information associated with user 101 or information of businesses and their physical locations. As an example and not by way of limitation, social-networking system 160 may infer a home location of user 101 based at least in part on an assumption that most people are at the home location during between 2-5:00 AM every weekday and the geo-location associated with the most probable location of user 101 at those times. As another example, social-networking system 160 may infer the place of employment of user 101 based at least in part on an assumption that most people are at the work place during between 2-5:00 PM every weekday and information of a business having a geo-location that coincides with the geo-location associated with the most probable location of user 101 at those times. As another example, based on a determination of the work place and work hours associated with user 101, social-networking system 160 may infer user 101 is a patron at a particular coffee shop on the way to the work place based at least in part on having a routine center at the geo-location of the coffee shop at a time prior to arriving at the work place. In particular embodiments, social-networking system 160 may modify or add social-graph information associated with user 101 in response to inferred information based on the time-based routine of user 101, as described below.

FIGS. 2A-C illustrate example grouping of ambient-location readings. As described above, the social-networking or third-party system may group multiple geo-location data points 50 obtained through filtering location readings obtained over a pre-determined time interval, such as for example 1 hour, using a spatial-clustering algorithm. As an example and not by way of limitation, spatial clustering may be performed on geo-location data points 50 obtained between for example 4:00-4:59 PM or 12:00-12:59 AM. In particular embodiments, the spatial-clustering algorithm represents the set of geo-location data points 50 as one or more geo-location clusters 54. In particular embodiments, geo-location centroids 52 of a pre-determined number of geo-location clusters 54 may be substantially randomly distributed among geo-location data points 50, as illustrated in FIG. 2A. As illustrated in the example of FIG. 2A, geo-location data points 50 may be assigned to a particular geo-location cluster 54 based at least in part on a distance between geo-location data points 50 and geo-location centroids 52. As an example and not by way of limitation, each geo-location data point 50 may be assigned to a particular geo-location cluster 54 that has the minimum distance between the geo-location centroid 52 of the particular geo-location cluster 54 and geo-location data point 50. In particular embodiments, for each geo-location cluster 54, a center of all the geo-location data points 50 within each geo-location cluster 54 may be calculated and the geo-location centroid 52 is updated to the location of the center of geo-location data points 50 of each geo-location cluster 54, as illustrated in FIG. 2B. As illustrated in the example of FIG. 2B, geo-location centroids 52 may be a geo-location that is separate the geo-location data points 50.

As illustrated in the example of FIG. 2C, geo-location clusters 54 may be reformed by assigning each geo-location data point 50 to a particular geo-location cluster 54 based at least in part on the assigning each geo-location data point 50 to the particular geo-location cluster 54 with geo-location centroid 52 closest to each geo-location data point 50. In particular embodiments, the steps of calculating the center of geo-location clusters 54, updating geo-location centroids 52 to the location of the center of geo-location data point 50 within each geo-location cluster 54, and reforming geo-location clusters 54 as illustrated in FIGS. 2A-C, may be performed a pre-determined number of times. Although this disclosure describes a grouping multiple geo-location data points using particular methods of spatial clustering, this disclosure contemplates grouping multiple geo-location data points using any suitable method of spatial clustering, such as for example, k-means or hierarchical clustering. In particular embodiments, geo-location centroids 52 calculated through spatial clustering may be stored by the social-networking or third-party system.

In particular embodiments, subsequent geo-location data points 50 may be used to refine the geo-location centroid 52 of geo-location clusters 54. As an example and not by way of limitation, subsequent geo-location data points 50 may be added to one of geo-location clusters 54 based at least in part on a distance between the subsequent geo-location data point 50 and geo-location centroid 52 of each geo-location cluster 54 being less than a pre-determined threshold. In particular embodiments, a new geo-location cluster 54 may be formed from a subsequent geo-location data point 50 in response to the distance between the subsequent geo-location data point 50 and geo-location centroid 52 of each geo-location cluster 54 being more than a pre-determined threshold.

FIGS. 3A-D illustrate time-based routine estimation. As described above, spatial clustering may be performed on location data obtained during particular pre-determined time intervals for each day of the week to generate geo-location clusters 54 for each pre-determined time interval for a particular date, as illustrated in the example of FIGS. 2A-C. In particular embodiments, routine centers 56A-C may be generated through spatial clustering of the geo-location centroids calculated at a particular time of day and particular day of the week to form snapshots of the geo-location of the client device associated with the user. As an example and not by way of limitation, spatial clustering, as illustrated in the example of FIGS. 2A-C, of geo-location centroids of the geo-graphic clusters calculated for each pre-determined time interval for each day of the week may be performed over a pre-determined period of time, such as for example 28 days, at particular time intervals, such as for example 1 hour intervals, and a particular day of the week, such as for example Mondays, to calculate routine centers 56A-C. In particular embodiments, the steps of calculating the center of the geo-location centroids, updating routine centers 56A-C to the location of the center of the geo-location centroids within each group of geo-location centroids, and reforming each group of geo-location centroids may be performed a pre-determined number of times. In the example of FIGS. 3A-D, one or more routine centers 56A-C associated with 3 particular users may be determined for a particular time of day of a particular day of the week through spatial clustering of calculated geo-location centroids.

Figure 3A:
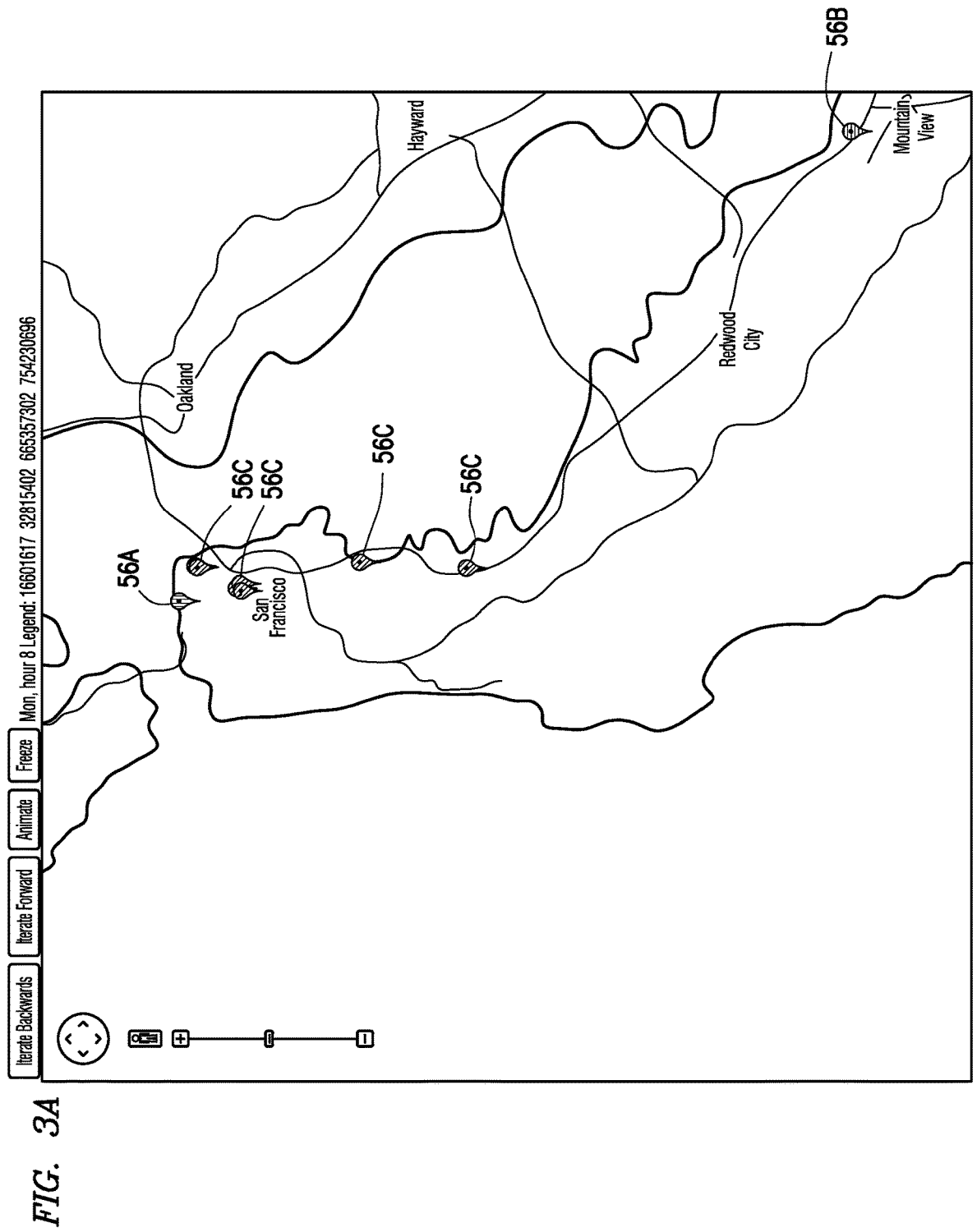
FIGS. 3A-D illustrate example time-based routine extraction.

As illustrated in the example of FIG. 3A, at a particular time of day, such as for example 8 AM, and particular day of the week, such as for example Monday, the social-networking or third-party system may determine routine centers 56A-C associated with each user. In the example of FIG. 3A, a single routine center 56A-B for a first and second user, respectively may indicate the first and second users are consistently at a particular geo-location during that particular time of day of that particular day of the week throughout the pre-determined period of time. In contrast, multiple routine centers 56C associated with a third user may represent variability in the geo-location of the third user during that time of day of that particular day of the week.

Figure 3B:
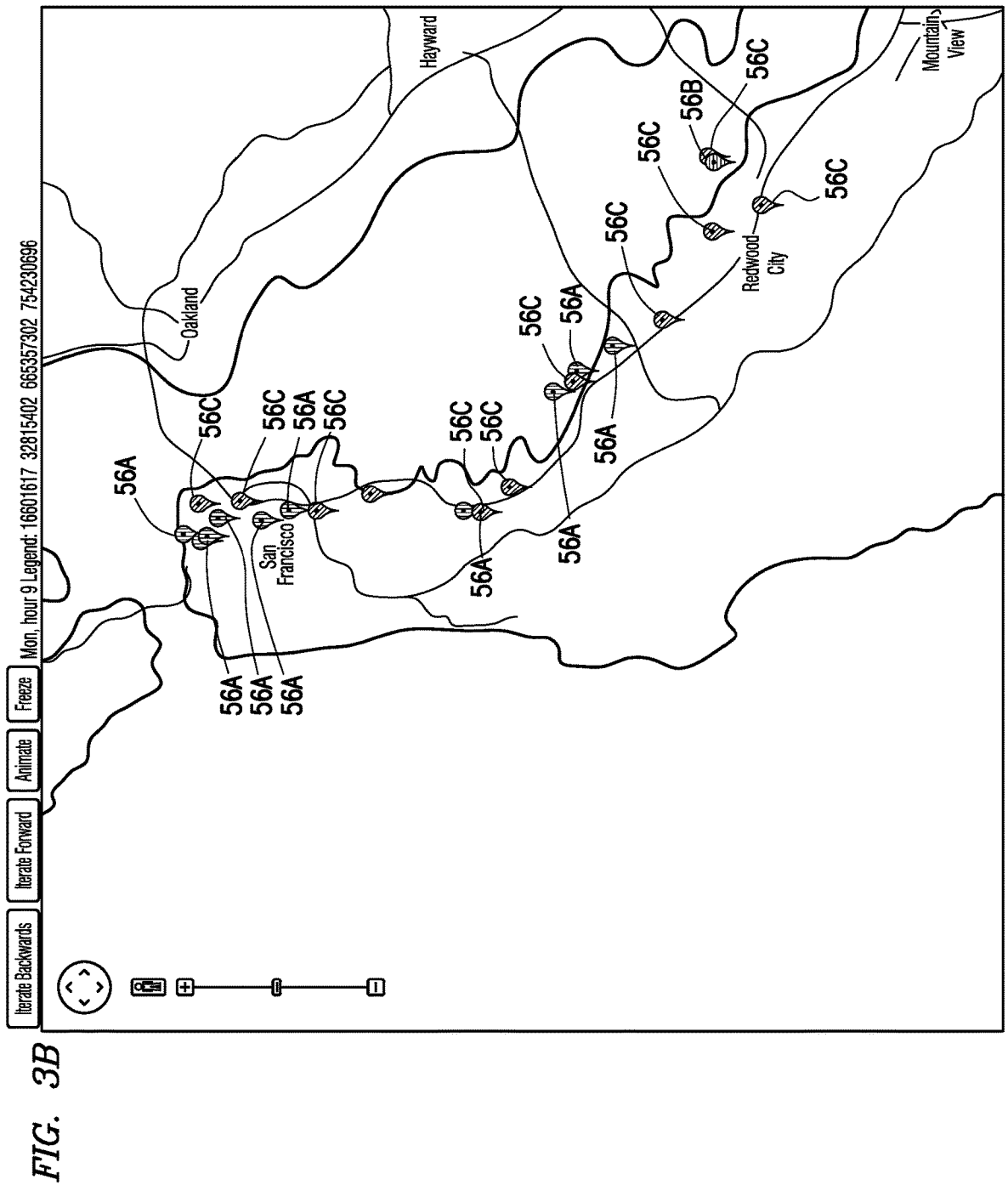
Figure 3C:
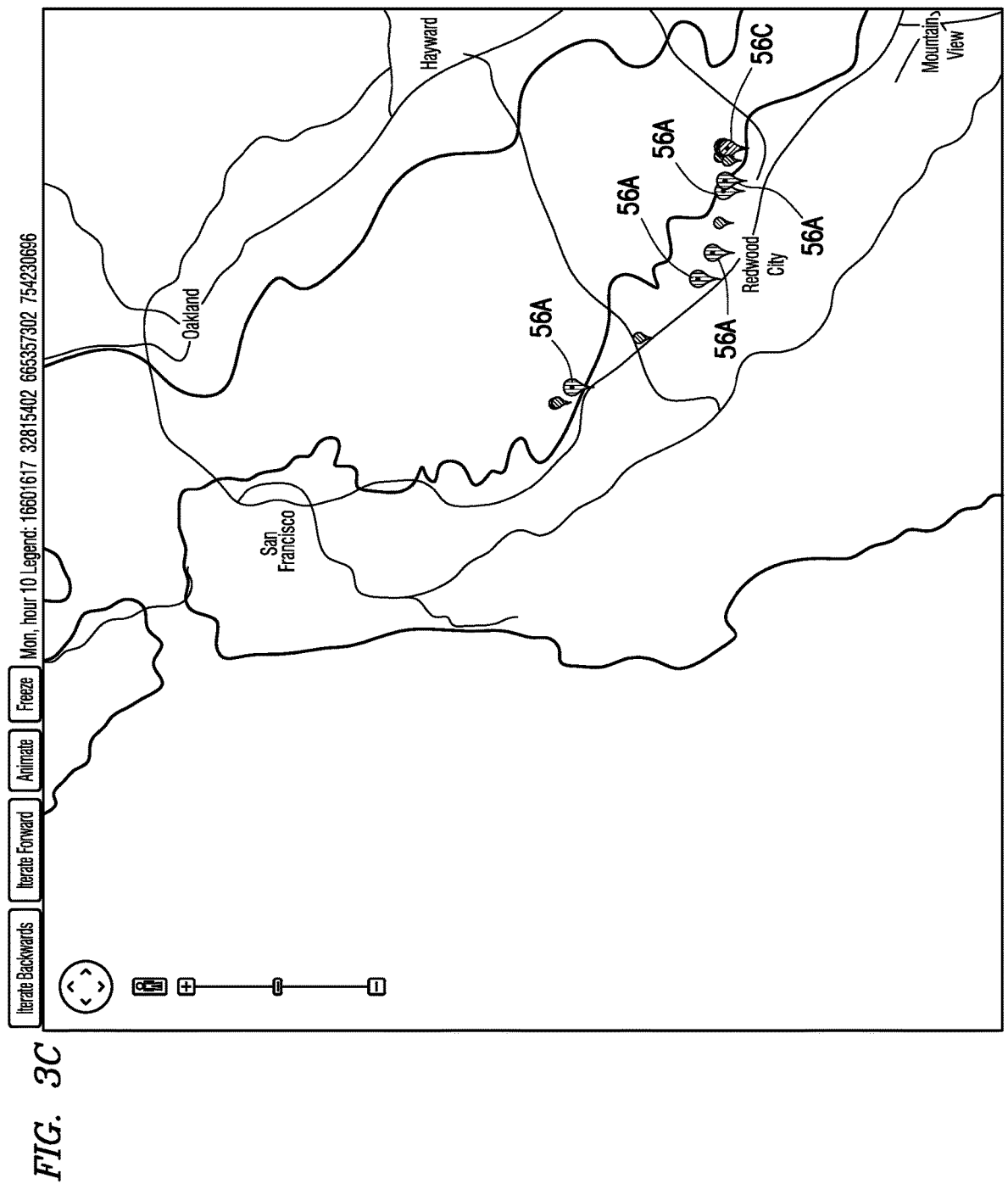

In the example of FIG. 3B, at Monday at 9 AM, routine center 56B associated with the second user is substantially at the same geo-location as the previous time of day, as illustrated in the example of FIG. 3A. Multiple routine centers 56A and 56C associated with the first and third user, respectively, may represent variability in the geo-location of the first and third users at the particular time and day of the week. In the example of FIG. 3C, routine center 56C associated with the third user is consistently at a particular geo-location during that particular time of day of that particular day of the week throughout the pre-determined period of time. Routine centers 56A associated with the first user are within a smaller geographic area than illustrated in the examples of FIGS. 3A-B. In the example of FIG. 3C, routine centers 56A and 56C associated with the first and third users, respectively, are within a relatively small geographic area. In particular embodiments, when the location readings of a particular time for a particular day of the week are confined to a relatively small geographic area, the routine centers 56A-C may determine the routine centers 56A-C to a higher level of precision compared to the level of detail illustrated in the example of FIGS. 3A-C.

The time-based routine of the user may be inferred based on routine centers 56A-C. In particular embodiments, routine centers 56A-C may be stored as a log that spans the pre-determined period of time by the social-networking or third-party system. As an example and not by way of limitation, routine centers 56A-C may be displayed as a time-elapsed animated sequence or discrete playback of routine centers 56A-C to form a pattern of routine centers 56A-C associated with the user. The social-networking or third-party system may determine a place that corresponds to one or more of routine centers 56A-C. As an example and not by way of limitation, the social-networking or third-party system may access a database of business information and associate one or more routine centers 56A-C to a particular business. In particular embodiments, a probability the user may be at a particular geo-location at a particular time of a particular day of the week may be estimated by calculating a percentage of geo-location centroids corresponding to the particular time are within the particular routine center 56A-C that corresponds to the particular geo-location. As an example and not by way of limitation, if a routine center 56A associated with the first user contains 8 geo-location centroids out of 10 geo-location centroids corresponding to the particular time of day, the social-networking or third-party system may infer the first user is at the routine center 56A during the particular time of day at the particular day of the week with 80% certainty.

Figure 3D:
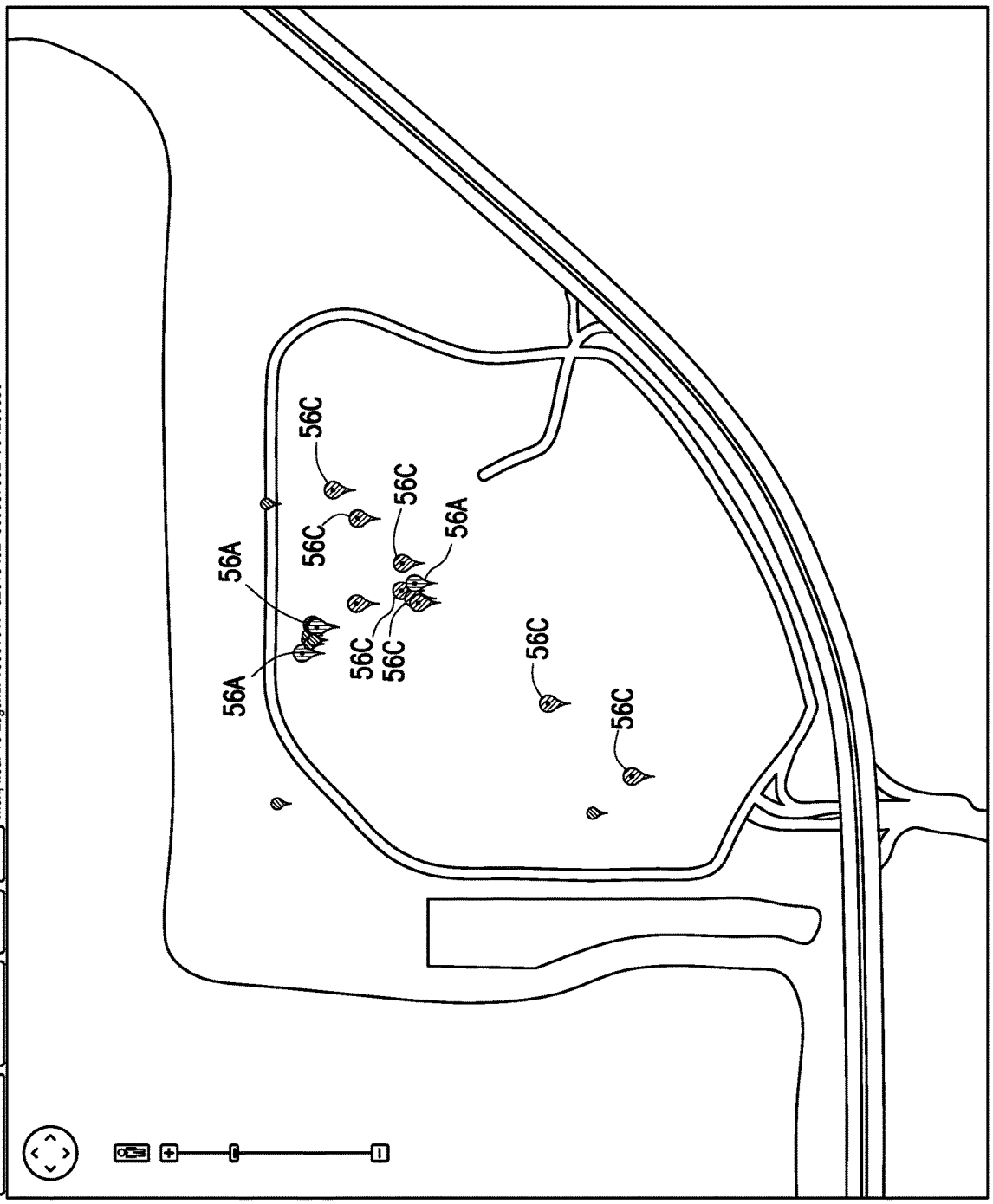

As described above, information of the user may be inferred based at least in part on the time-based routine of user. As an example and not by way of limitation, the social-networking system or third-party system may infer a home location of the first user is a particular location in San Francisco based at least in part on the first user having a single routine center 56A at 8 AM on Mondays, as illustrated by example of FIG. 3A. As another example, the social-networking or third-party system may infer the first user may be commuting to work based at least in part on variability of routine centers 56A, as illustrated by the example of FIGS. 3B-C. As an example and not by way of limitation, the social-networking or third-party system may access a database to determine that routine centers 56A correspond to a particular freeway and infer the first user is commuting to a work place. Moreover, the social-networking and third-party system may infer the work place of the first user based on having routine centers 56A within a relatively small geographic area during work hours, such as for example 1 PM, as illustrated in the example of FIG. 3D and correlating the geo-location corresponding to the routine centers 56A with a work place stored in one or more databases of the social-networking or third-party systems.

As described above, a notification may be sent to a user with a relationship to a particular user in response to the particular user deviating from the inferred time-based routine. In particular embodiments, the social-networking or third-party system determine a particular routine center 56A-C from the pattern of routine centers 56A-C that has a minimum distance to the current geo-location of the user. The social-networking or third-party system may determine the distance between the particular routine center 56A-C of the pattern and the current geo-location, and send a notification to one or more other users in response to the distance between the particular routine center 56A-C and the current geo-location being longer than a pre-determined deviation threshold value. As an example and not by way of limitation, a notification may be sent to a user with a "friend" relationship to the first user in response to the first user having location readings in San Francisco at 1 PM on a Monday that deviate from routine centers 56A that indicate the first user is normally in Menlo Park at that day and time, as illustrated in the example of FIG. 3D. Moreover, the notification may be sent to users with a relationship to the first user where a distance between the current geo-location of the users and the current geo-location of the first user is shorter than a pre-determined proximity threshold value. As an example and not by way of limitation, the notification that the first user is deviating from his routine by being in San Francisco may be sent to "friends" with a current geo-location in San Francisco.

Figure 4:
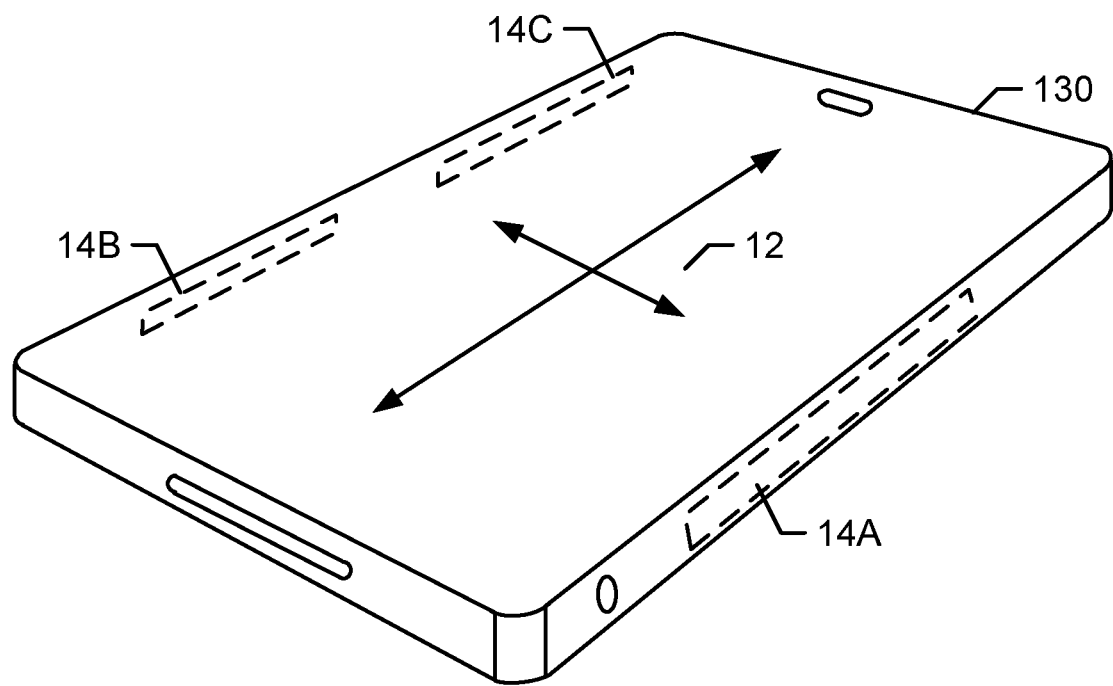
FIG. 4 illustrates an example mobile device.

FIG. 4 illustrates an example mobile device. In particular embodiments, the client system may be a mobile device 130 as described above. This disclosure contemplates mobile device 130 taking any suitable physical form. In particular embodiments, mobile device 130 may be a computing system as described below. As example and not by way of limitation, mobile device 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 130 may have a touch sensor 12 as an input component. In the example of FIG. 4, touch sensor 12 is incorporated on a front surface of mobile device 130. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 4, one or more antennae 14A-C may be incorporated into one or more sides of mobile device 130. Antennae 14A-C are components that convert electric current into radio waves, and vice versa. During transmission of signals, a transmitter applies an oscillating radio frequency (RF) electric current to terminals of antenna 14A-C, and antenna 14A-C radiates the energy of the applied the current as electromagnetic (EM) waves. During reception of signals, antennae 14A-C convert the power of an incoming EM wave into a voltage at the terminals of antennae 14A-C. The voltage may be transmitted to a receiver for amplification.

As described above, the social-networking or third-party system may poll or "ping" mobile device 130 using an activation signal to obtain location information. As an example and not by way of limitation, the social-networking system may poll an application executed by mobile device 130 for location data by sending the activation signal activate a location service of mobile device 130. The activation signal may be transmitted using a wireless communication protocol such as for example, WI-FI or third-generation mobile telecommunications (3G) and received by mobile device 130 through one or more antennae 14A-B. In particular embodiments, the location service of mobile device 130 may use one or more methods of location determination, such as for example, using the location of one or more cellular towers, crowd-sourced location information associated with a WI-FI hotspot, or the GPS function of mobile device 130.

As described above, the social-networking or third-party system may transmit an activation signal to the application executed by mobile device 130 at the end of the pre-determined sampling duration. The application may transmit the acquired location data and other relevant data to the social-networking or third-party system in response to receiving the transmission signal. In particular embodiments, additional location-service activation signals are periodically transmitted to mobile device 130 during location-data acquisition to keep the application from reverting to the sleep mode before the location data is acquired. As described above, the social-networking or third-party system may adjust the amount of data sent to mobile device 130 based on whether mobile device 130 is stationary or moving. In particular embodiments, a location service of mobile device 130 is activated for the pre-determined sampling duration when receiving one or more location-service activation signals that keeps the application of mobile device 130 active for the pre-determined sampling duration.

The application activates the location service of mobile device 130 in response to receiving the location-service activation signal. In particular embodiments, the location service of mobile device 130 may use one or more methods of location determination, such as for example, using the location of one or more cellular towers, crowd-sourced location information associated with a WI-FI hotspot, or the GPS function of mobile device 130. In particular embodiments, the application of mobile device 130 may transmit location data and other relevant data, such as for example, the signal strength from nearby cellular towers. In particular embodiments, an operating system (OS) of mobile device 130 may arbitrate collecting data by the various methods used by the location service of mobile device 130. As an example and not by way of limitation, the method used by the location service of mobile device 130 may depend at least in part on the pre-determined sampling duration of the location measurement. As an example and not by way of limitation, the application may use GPS data as the primary source of location information depending at least in part on whether mobile device 130 is able to acquire GPS data within the pre-determined sampling duration. As another example, if mobile device 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

In particular embodiments, the application executed on mobile device 130 receives the activation signal that wakes the application from the sleep mode and activates the location service of mobile device 130 for a pre-determined sampling duration, such as for example 10 seconds. As described above, the social-networking or third-party system may adjust the polling frequency (i.e. the time interval between signal transmissions) and sampling duration according to the travel distance of mobile device 130. The pre-determined sampling duration depends at least in part on the desired accuracy of the location data. Increasing the pre-determined sampling duration increases the accuracy of the location of mobile device 130 due at least in part to the application having a higher probability of acquiring GPS data or the location service being able to acquire more detailed GPS data.

Figure 5:
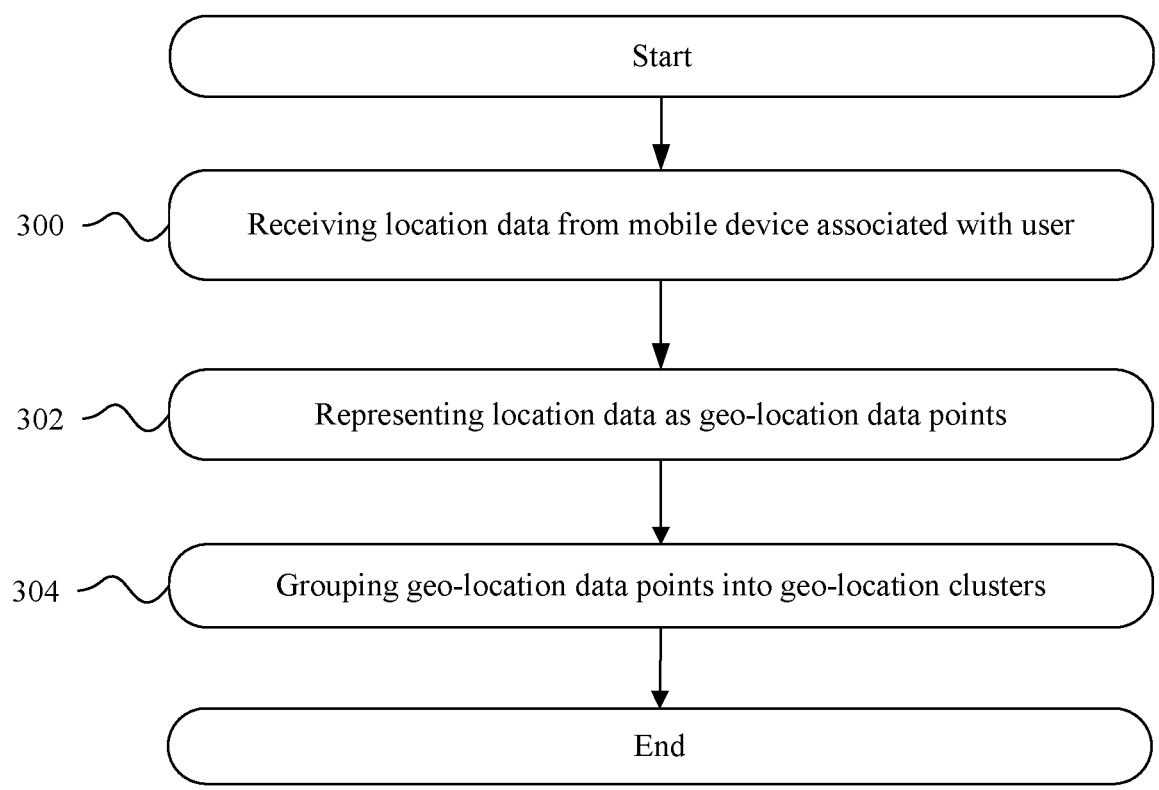
FIG. 5 illustrates an example method for grouping ambient-location updates.

FIG. 5 illustrates an example method for grouping ambient-location updates. The method may start at step 300, where a computing device receives location data from a mobile device associated with a user. In particular embodiments, the location data may include one or more location readings that are sent automatically and without manual input from the user. Step 302 represents the location data as one or more geo-location data points. In particular embodiments, the representation may be based at least in part on a distance between the location readings and the geo-location data points. At step 304, the computing device groups one or more of the geo-location data points into one or more geo-location clusters, at which point the method may end. In particular embodiments, the grouping may be based at least in part on a distance between each geo-location data point and a geo-location centroid of each geo-location cluster. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
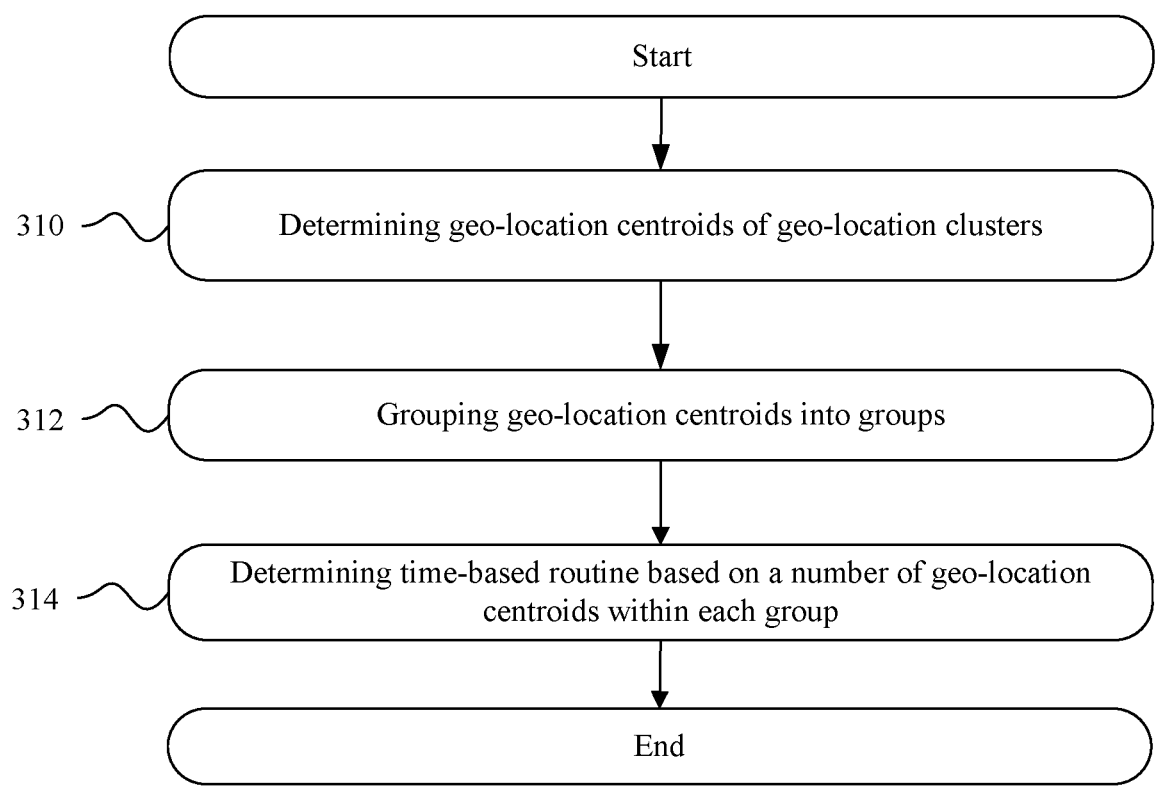
FIG. 6 illustrates an example method for routine estimation.

FIG. 6 illustrates an example method for routine estimation. The method may start at step 310, where a computing device determines a geo-location centroid of each of one or more geo-location clusters. In particular embodiments, the geo-location centroid corresponds to one or more geo-location data points within its geo-location cluster. The geo-location data points may represent one or more location readings from a mobile computing device associated with a user. The geo-location centroids may be based at least in part on location readings obtained during a particular time of day of a particular day of a week. In particular embodiments, the location data includes one or more location readings being sent automatically and without manual input from the user. Step 312 groups by the computing device one or more geo-location centroids into one or more groups. At step 314, the computing device determines a time-based routine based at least in part on a number of geo-location centroids within each group, at which point the method may end. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components carrying out particular steps of the method of FIG. 6, this disclosure contemplates any suitable combination of any suitable components carrying out any suitable steps of the method of FIG. 6.

Figure 7:
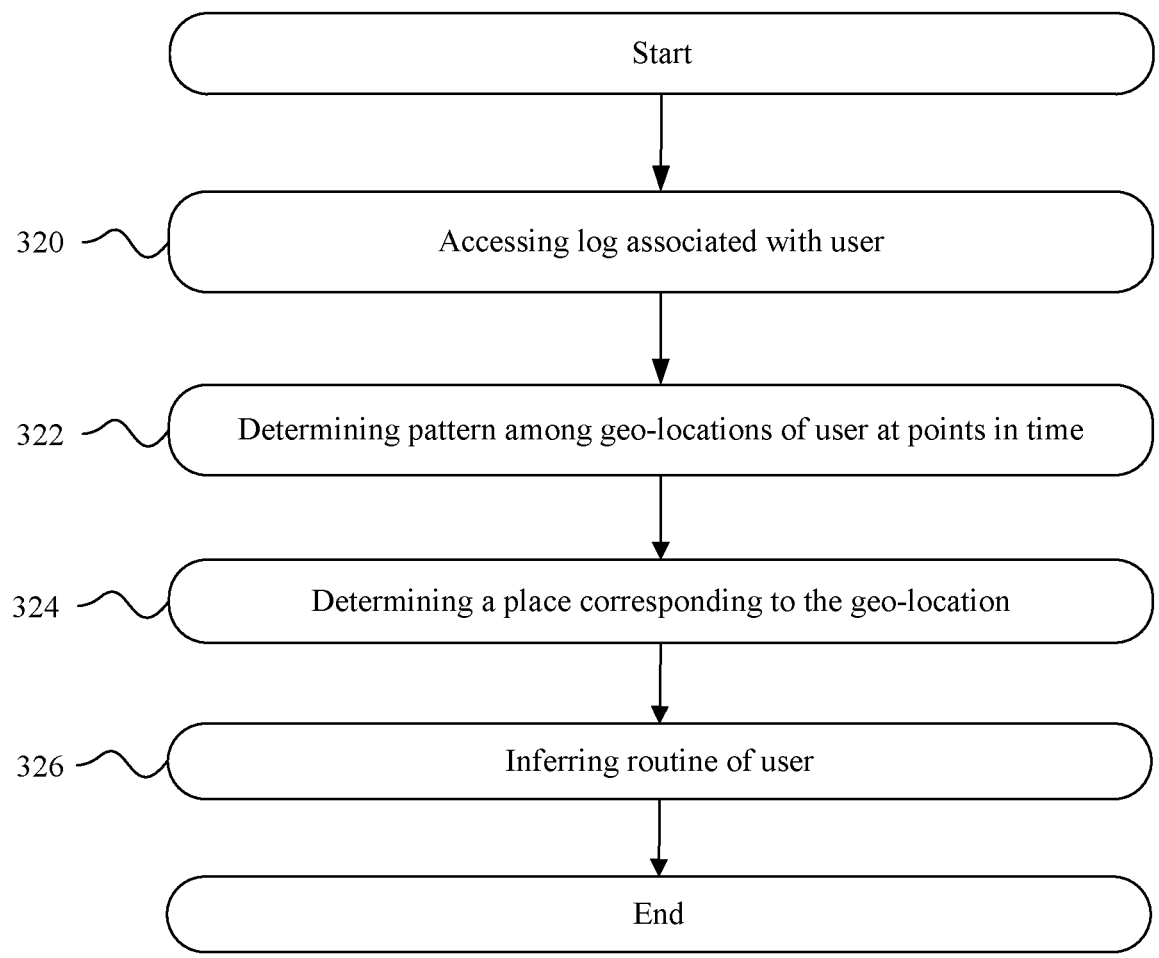
FIG. 7 illustrates an example method for labeling a pattern of a user.

FIG. 7 illustrates an example method for labeling a pattern of a user. The method may start at step 320, where a computing device accesses a log associated with a user. In particular embodiments, the log comprises entries that each indicate a geo-location of the user at a point in time. The log may span a period of time and some of the entries may be based on a geo-location determined and reported by a mobile computing device of the user without manual user input. In particular embodiments, the location data comprising one or more location readings being sent automatically and without manual input from the user. Step 322 determines by the computing device a pattern among the geo-locations of the user at the points in time. Step 324 determines by the computing device, a place corresponding to the geo-location for some of the geo-locations. At step 326, the computing device infers a routine of the user based at least in part on the pattern and the places, at which point the method may end. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components carrying out particular steps of the method of FIG. 7, this disclosure contemplates any suitable combination of any suitable components carrying out any suitable steps of the method of FIG. 7.

Figure 8:
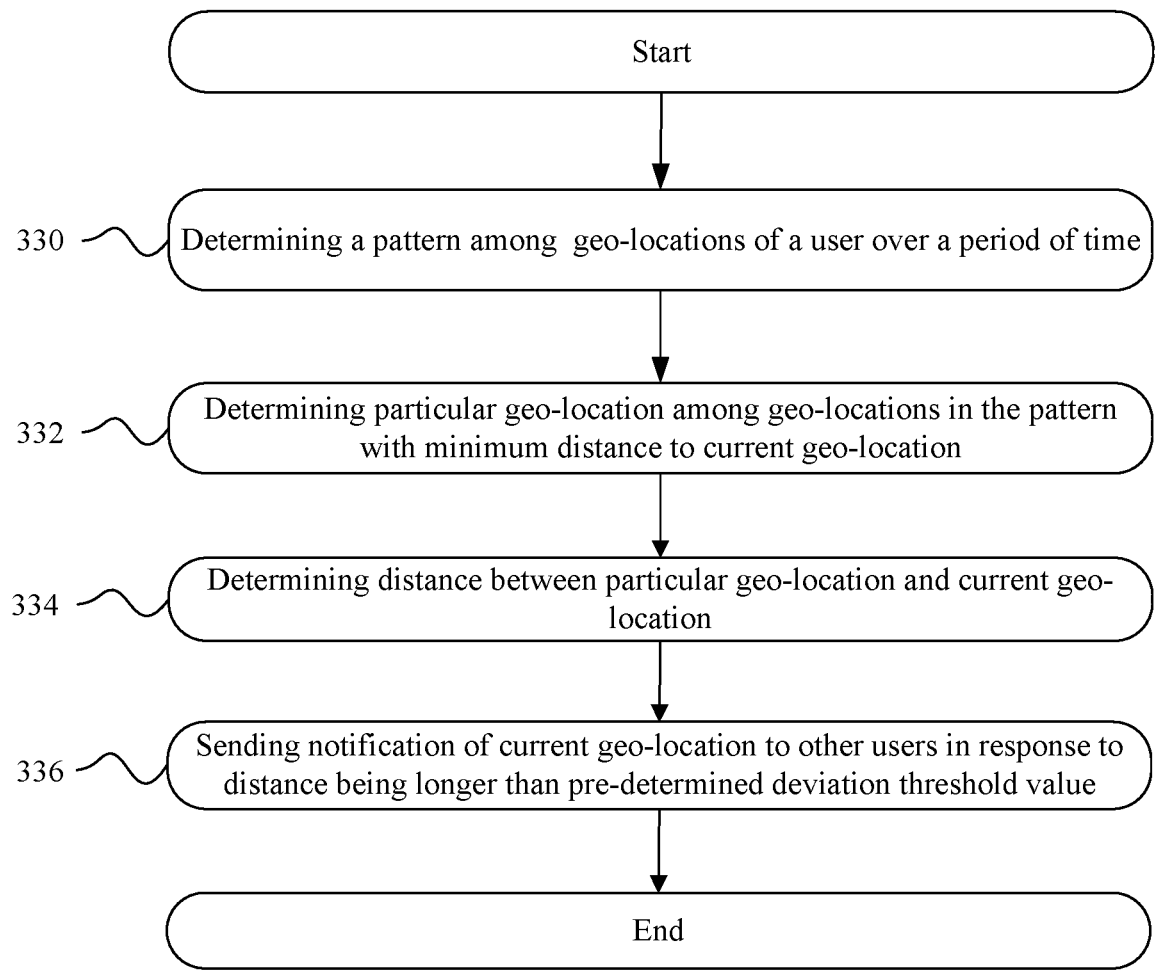
FIG. 8 illustrates an example method for providing a routine deviation notification.

FIG. 8 illustrates an example method for providing a routine deviation notification. The method may start at step 330, where a computing device determines a pattern among a number of geo-locations of a user over a period of time. In particular embodiments, each geo-location is determined and reported by a mobile computing device of the user without manual user input. Step 332 determines by the computing device a particular geo-location among the geo-locations in the pattern with a minimum distance to a current geo-location of the mobile computing device. Step 334 determines by the computing device a distance between the particular geo-location and the current geo-location. At step 336, the computing device sends a notification of the current geo-location to other users in response to the distance being longer than a pre-determined deviation threshold value, at which point the method may end. In particular embodiments, the other users have a relationship to the user based at least in part on social-graph information associated with the user. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates particular components carrying out particular steps of the method of FIG. 8, this disclosure contemplates any suitable combination of any suitable components carrying out any suitable steps of the method of FIG. 8.

Figure 9:
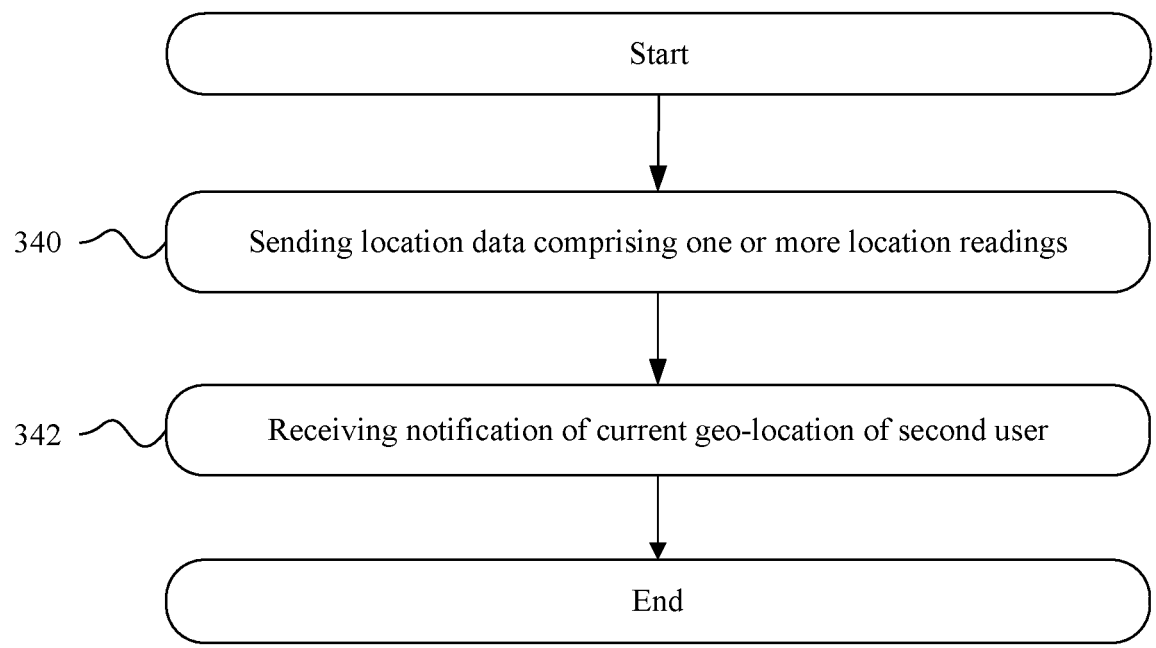
FIG. 9 illustrates an example method for notifying a user of a routine deviation.

FIG. 9 illustrates an example method for notifying a user of a routine deviation. The method may start at step 340, where a mobile computing device sends location data that includes one or more location readings. In particular embodiments, the location readings correspond to a current geo-location of the first user. At step 342, the mobile computing device receives a notification of a current geo-location of a second user in response to a distance between a particular geo-location associated with the second user and the current geo-location of the second user being larger than a pre-determined deviation threshold value, at which point the method may end. In particular embodiments, the pattern comprises geo-locations of the second user over a period of time. Moreover, the particular geo-location may have a minimum distance to a current geo-location of the second user. The second user may have a relationship to the first user based at least in part on social-graph information associated with the first user. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates particular components carrying out particular steps of the method of FIG. 9, this disclosure contemplates any suitable combination of any suitable components carrying out any suitable steps of the method of FIG. 9.

Figure 10:
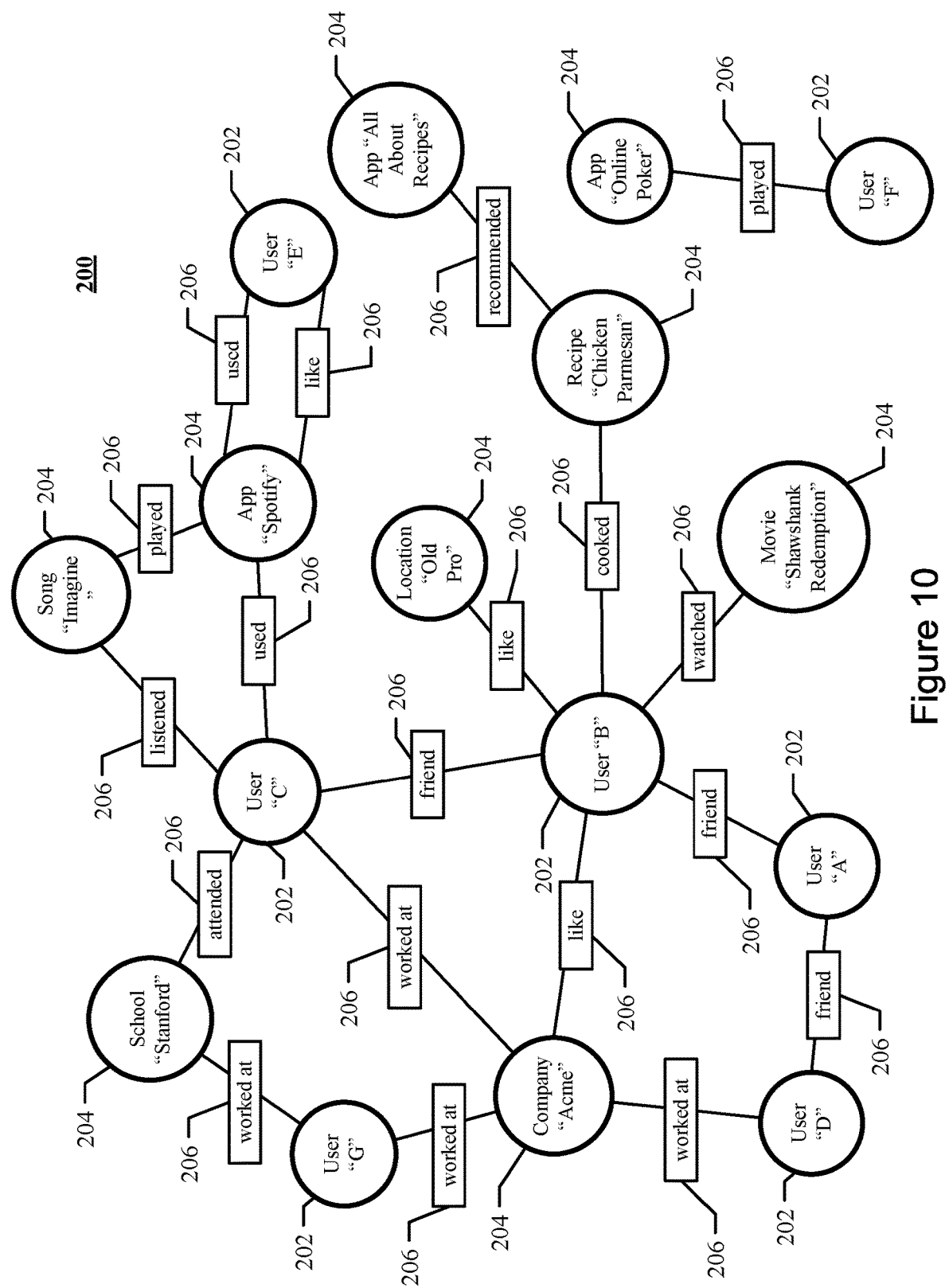
FIG. 10 illustrates an example social graph.

FIG. 10 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 10 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, user node 202 may be associated with information inferred from the time-based routine of the user. As an example and not by way of limitation, a home location of the user inferred from a routine center obtained during particular hours of the day, such as for example 2-5:00 AM, and the home location of the user may be associated with user node 202. In particular embodiments, social-networking system 160 may be able to augment information provided by the user. As an example and not by way of limitation, the user may provide a home location of San Francisco and social-networking system 160 may infer the home location of the user with accuracy within a particular area or street of San Francisco. Moreover, social-networking system may associate the area or street information with user node 202.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 10, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206. As described above, a notification may be sent to a user associated with a user node 202 with a relationship to a user who deviates from their time-based routine. As an example and not by way of limitation, a notification may be sent to user "B" who works in San Francisco and is connected to user "A" through a friend relationship in response to user "A" deviating from their time-based routine, such as for example, by being in San Francisco during work hours.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 10) between user nodes 202 corresponding to the user and concept nodes 204 corresponding to the song and application to indicate that the user listened to the song and used the application. Moreover, social-networking system 160 may create a "played" edge 206 (as illustrated in FIG. 10) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 6 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may create an edge 206 between a user node 202 and a concept node 204 in social graph 200 in response to information of a user inferred from the time-based routine of the user, as described above. As an example and not by way of limitation, social-networking system 160 may infer the user associated with user node 202 likes particular coffee shop based on the time-based routine of the user and information associated with one or more concept nodes 204. As described above, social-networking system 160 may infer the user frequents a particular coffee shop based at least in part a routine center associated with the user coinciding with the location of the coffee shop at a time prior to arriving at the inferred work place of the user. Moreover, the social-networking may create an edge 206 corresponding to a "like" between user node 202 associated with the user and concept node 204 associated with the particular coffee shop. As another example, social-networking system may create an edge 206 between a user node 202 and a concept node 204 that corresponds to a business based at least in part on the inferred time-based routine of the user. As described above, social-networking system may infer user may infer the employer of the user based on the user having a routine center at the place of business and may create an edge 206 corresponding to a "worked at" relationship between user node 202 and concept node 204 corresponding to the employer.

As another example, social-networking system 160 may create an edge 206 corresponding to a "like" relationship between user node 202 and concept node 204 corresponding to a particular type of music or particular sporting team based at least in part on the time-based routine of the user. Social-networking system 160 may create edge 206 corresponding to a "like" relationship between user node 202 and concept node 204 corresponding to a particular sports team in response to the user having a routine center at a venue of the sporting team. As another example, social-networking system 160 may create an edge 206 corresponding to a "like" relationship between user node 202 and concept node 204 corresponding to a particular type of music in response to the user having a routine center at a venue, such as for example a Jazz club, that specializes in a particular type of music.

Figure 11:
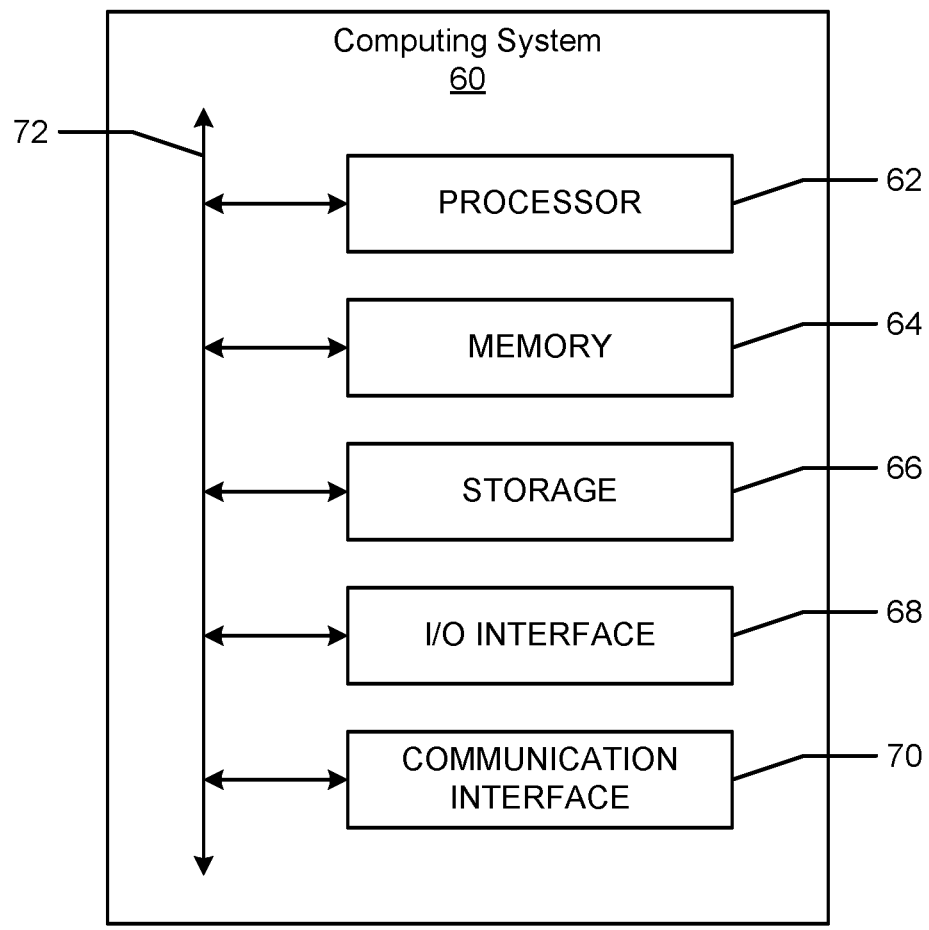
FIG. 11 illustrates an example computing system.

FIG. 11 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, accessing a log associated with a user, wherein the log comprises a plurality of entries that each indicate a geo-location of the user at a particular time of day of a particular day of a week, wherein at least some of the data points being based on a geo-location determined and reported by a mobile computing device of the user without manual user input;

by the computing device, determining a plurality of geo-location centroids based on a distance between the respective geo-location centroid and each geo-location data point, wherein each geo-location centroid is representative of a cluster comprising one or more of the geo-location data points obtained during the particular time of day of the particular day of a week;

by the computing device, determining a routine center of two or more of the plurality of geo-location centroids based on a distance between its respective routine center and each geo-location centroid, wherein each routine center is a spatial center of a respective plurality of geo-location centroids of the particular time of the particular day of the week;

by the computing device, determining a time-based routine of the particular day of the week based at least in part on a number of routine centers of each particular time of day of the particular day of the week, the time-based routine comprising a pattern of a plurality of routine centers of a plurality of times of the day and of the particular day of the week;

by the computing device, determining a probability of the user being at a particular routine center at the particular time of day of the particular day of the week based at least in part on a number of geo-location centroids represented by the particular routine center; and by the computing device, associating a node of a social graph corresponding to the user with information associated with a particular routine center at the particular time of day of the particular day of the week having a highest probability.

2. The method of claim 1, further comprising determining a place corresponding to one or more of the routine centers, wherein the place corresponds to one or more particular activities.

3. The method of claim 2, wherein the place comprises a residence, grocery store, restaurant, supermarket, sporting venue, landmark, freeway, movie theater, or place of employment.

4. The method of claim 2, wherein the determination of the place comprises accessing a database and associating the respective routine center with information from the database.

5. The method of claim 2, wherein the particular activities comprise working, patronizing, residing, attending an event, or visiting.

6. The method of claim 2, wherein:
the social graph comprises a plurality of nodes and edges connecting the nodes;
and
at least one node in the social graph corresponds to the place.

7. The method of claim 6, further comprising modifying the social graph based on the particular activities.

8. The method of claim 6, further comprising connecting the node corresponding to the user to the node corresponding to the place with one of the edges.

9. The method of claim 8, wherein the one of the edges is associated with one or more of the particular activities.

10. The method of claim 1, further comprising inferring a location of the user at a future time corresponding to the particular time of day of the particular day of the week based on the determined probability of the user being at the particular routine center at the particular time of day of the particular day of the week.

11. The method of claim 1, further comprising sending a signal to the mobile computing device adjusting a frequency of determining the geo-location of the mobile computing device based on the identified particular one of the routine centers.

12. The method of claim 1, wherein determining the routine comprises by the computing device, inferring the user is employed at a particular business based at least in part on a number of entries corresponding to a geo-location of the particular business at points of time corresponding to working hours.

13. One or more computer-readable non-transitory storage media embodying software configured when executed to:
access a log associated with a user, wherein the log comprises a plurality of entries that each indicate a geo-location of the user at a particular time of day of a particular day of a week, wherein at least some of the data points being based on a geo-location determined and reported by a mobile computing device of the user without manual user input;
determine a plurality of geo-location centroids based on a distance between the respective geo-location centroid and each geo-location data point, wherein each geo-location centroid is representative of a cluster comprising one or more of the geo-location data points obtained during the particular time of day of the particular day of a week;
determine a routine center of two or more of the plurality of geo-location centroids based on a distance between its respective routine center and each geo-location centroid, wherein each routine center is a spatial center of a respective plurality of geo-location centroids of the particular time of the particular day of the week;
determine a time-based routine of the particular day of the week based at least in part on a number of routine centers of each particular time of day of the particular day of the week, the time-based routine comprising a pattern of a plurality of routine centers of a plurality of times of the day and of the particular day of the week;
determine a probability of the user being at a particular routine center at the particular time of day of the particular day of the week based at least in part on a number of geo-location centroids represented by the particular routine center; and
associate a node of a social graph corresponding to the user with information associated with a particular routine center at the particular time of day of the particular day of the week having a highest probability.

14. The media of claim 13, wherein the software is further configured to determine a place corresponding to one or more of the routine centers, and wherein the place corresponds to one or more particular activities.

15. The media of claim 14, wherein the place comprises a residence, grocery store, restaurant, supermarket, sporting venue, landmark, freeway, movie theater, or place of employment.

16. The media of claim 14, wherein the activity comprises working, patronizing, residing, attending an event, or visiting.

17. The media of claim 14, wherein:
the social graph comprises a plurality of nodes and edges connecting the nodes;
and
at least one node in the social graph corresponds to the place.

18. The media of claim 17, wherein the software is further configured to modify the social graph based on the particular activities.

19. A device comprising:

one or more processors; and one or more computer-readable non-transitory storage media coupled to the processors and embodying software configured when executed to:

access a log associated with a user, wherein the log comprises a plurality of entries that each indicate a geo-location of the user at a particular time of day of a particular day of a week, wherein at least some of the data points being based on a geo-location determined and reported by a mobile computing device of the user without manual user input;

determine a plurality of geo-location centroids based on a distance between the respective geo-location centroid and each geo-location data point, wherein each geo-location centroid is representative of a cluster comprising one or more of the geo-location data points obtained during the particular time of day of the particular day of a week;

determine a routine center of two or more of the plurality of geo-location centroids based on a distance between its respective routine center and each geo-location centroid, wherein each routine center is a spatial center of a respective plurality of geo-location centroids of the particular time of the particular day of the week;

determine a time-based routine of the particular day of the week based at least in part on a number of routine centers of each particular time of day of the particular day of the week, the time-based routine comprising a pattern of a plurality of routine centers of a plurality of times of the day and of the particular day of the week;

determine a probability of the user being at a particular routine center at the particular time of day of the particular day of the week based at least in part on a number of geo-location centroids represented by the particular routine center; and associate a node of a social graph corresponding to the user with information associated with a particular routine center at the particular time of day of the particular day of the week having a highest probability.

20. The device of claim 19, wherein the software is further configured to determine a place corresponding to one or more of the routine centers, and wherein the place corresponds to one or more particular activities.

* * * * *